United States Patent [19]

Czuchajowska et al.

[11] Patent Number: 5,439,526
[45] Date of Patent: Aug. 8, 1995

[54] PROCESS FOR FRACTIONATING WHEAT FLOURS TO OBTAIN PROTEIN CONCENTRATES AND PRIME STARCH

[75] Inventors: Zuzanna Czuchajowska, Moscow, Id.; Yeshajahu Pomeranz, Pullman, Wash.

[73] Assignee: Washington State University Research Foundation, Pullman, Wash.

[21] Appl. No.: 131,061

[22] Filed: Oct. 1, 1993

[51] Int. Cl.[6] .................... C08B 30/00; C13F 1/06
[52] U.S. Cl. ...................................... 127/67; 127/56; 127/70; 127/71
[58] Field of Search ................ 127/67, 56, 70, 71

[56] References Cited

U.S. PATENT DOCUMENTS

| | | | |
|---|---|---|---|
| 3,901,725 | 8/1975 | Bond et al. | 127/70 |
| 4,448,790 | 5/1984 | Sarkki et al. | 127/56 |
| 5,115,984 | 5/1992 | Satake | 241/7 |

FOREIGN PATENT DOCUMENTS

258718  6/1908  Germany ................ 42/42

OTHER PUBLICATIONS

Sarkki, Marja-Leena (1980) "Wheat Gluten" in Cereals for Food and Beverages 155–169, Month Not Available.

Barr, Derek J. (1989) "The Engineering of a Modern Wheat Starch Process" Chapter 29, in Wheat is Unique 501–508 Month Not Available.

Zwitserloot, W. R. M. (1989) "Production of Wheat Starch and Gluten: Historical Review and Development into a New Approach" Chapter 30, in Wheat is Unique 509–520 Month Not Available.

Tressler, D. K., W. J. Sultan (1975) "Wheat Protein Concentrate and Wheat Starch" Foods Products Formulary 2:11–12 Month Not Available.

Mauritzen, C. M., P. R. Stewart (1965) "The Ultracentrifugation of Doughs Made from Wheat Flour" Austral. J. Biol. Sci. 18:173–189. Month Not Available.

Fellers, David A. (1973) "Fractionation of Wheat into Major Components" Chapter 4, in Industrial Uses of Cereals 270–228.

Kempf, W., C. Röhrmann (1989) "Process for the Industrial Production of Wheat Starch from Whole Wheat" Chapter 31, in Wheat is Unique 521–540.

Meuser, F. et al. (1989) "Developments in the Extraction of Starch and Gluten from Wheat Flour and Wheat Kernels" Chapter 28, in Wheat is Unique 479–500.

*Primary Examiner*—Paul Lieberman
*Assistant Examiner*—Patricia L. Hailey
*Attorney, Agent, or Firm*—Saliwanchik & Saliwanchik

[57] ABSTRACT

Disclosed and claimed is a rapid, simple process for fractionating wheat flour into components comprising protein concentrates and prime starch. The claimed method utilizes minimal water and produces a low waste water load. Flour and liquid are mixed to form a dough. Additional liquid is added to the dough and the dough and liquid are vigorously dispersed. The dispersion is centrifuged and forms distinct fractions-layers that are separated for the recovery of vital gluten and prime starch.

6 Claims, No Drawings

PROCESS FOR FRACTIONATING WHEAT FLOURS TO OBTAIN PROTEIN CONCENTRATES AND PRIME STARCH

This invention was made with government support under Agreement Nos. 88-33574-4054, 89-33574-4275 and 93-34270-8378 from the United States Department of Agriculture. The government has certain rights in the invention.

BACKGROUND OF THE INVENTION

Major components of wheat flour include gluten and wheat starch. Gluten is the product of an interaction between water and the water-insoluble protein constituents of wheat which comprise about 80% of the protein content of flour. Wheat gluten is a common food additive and is essential in breadmaking as it provides the bread with texture. Wheat starch is used for various commercial purposes.

The many processes for the production of vital wheat gluten can be grouped generally into two types: a) those based on the Martin system in which a dough is developed prior to separation into gluten, starch and water solubles, by a doughwashing process; and b) the batter system, in which wheat flour dispersions are fractionated by centrifugal separation with decanters or hydrocyclones (Fellers, D. A. (1973) "Fractionation of wheat into major components," Chapter 4, In *Industrial Uses of Cereals*, Y. Pomeranz ed. Am. Assoc. Cereal Chem., St. Paul, Minn., pp. 207–228; Kempf, W., and Rohrmann (1989) "Process for the industrial production of wheat starch from whole wheat," Chapter 31, In *Wheat is Unique*, Y. Pomeranz, ed. Am. Assoc. Cereal Chem., St. Paul, Minn., pp. 521–540; Meuser, F., F. Althoff, and H. Huster (1989) "Developments in the extraction of starch and gluten from wheat flour and wheat kernels," Chapter 28, In *Wheat is Unique*, Y. Pomeranz, ed. Am. Assoc. Cereal Chem., St. Paul, Minn., pp. 479–500). The main disadvantages of the Martin dough system are the large amounts of water used (up to 10 $m^3$/ton of flour), the generation of heavy waste water loads (up to 5–8 $m^3$/ton flour) and some limited impairment of the functional properties of the resulting gluten (e.g., lower vitality, water absorption, and rate of hydration) (Sarkki, M. L. (1980) "Wheat gluten," In *Cereals for Food and Beverages*, G. F. Inglett and L. Munck eds. Academic Press, New York, pp. 155–169). Likewise, in some batter (slurry) systems, the total amounts of water used and waste water loads are claimed to be 3 and 2 $m^3$/ton flour, respectively. The practical, engineering-technological advantages and limitations of batter separation systems have been the subject of much controversy (Bart, D. J. (1989) "The engineering of a modern wheat starch process," Chapter 29, In *Wheat is Unique*, Y. Pomeranz ed. Am. Assoc. Cereal Chem., St. Paul, Minn., pp. 502–508; Zwisterloot, W. R. M. (1989) "Production of wheat starch and gluten: Historical review and development into a new approach," Chapter 30, In *Wheat is Unique*, Y. Pomeranz ed. Am. Assoc. Cereal Chem., St. Paul, Minn., pp. 509–520) and claims of batter fractionation processes using low water consumption have been challenged. The two main fractionation systems—dough and slurry—are suggested to be incompatible in that success in the batter system requires that no dough development occur during fractionation (Fellers, supra; Meuser et al., supra).

In addition to the large water requirement, waste water load, and high energy requirements, a further disadvantage of the Martin system is that the starch is admixed with pentosans that can adversely affect functional-breadmaking properties (Meuser, supra). In the batter system (unlike the dough system) it is possible to obtain a high yield of a pure, prime starch fraction of large-granule A-starch and a second fraction of B-starch in which the small granules are admixed with pentosans. There is a good market and use for both fractions if they can be separated at high resolution and yield.

A German Patent, P258 718, describes a process for the simultaneous production of wheat starch and wheat gluten. Although the process employs less water than other slurry/batter methods, fractions must be further processed to obtain useable products.

Another batter-procedure for the fractionation of wheat protein concentrate and starch from wheat flour was developed by the USDA. Accordingly, "Wheat flour is rapidly mixed in an optimum of water and them finely dispersed by additional cutting type shear that prevents gluten development. The slurry is fed to a continuous decanter-type centrifuge where prime starch is spun out and the liquid protein concentrate (PC) is decanted" (Tressler, D. K., and W. J. Sultan (1975) "Wheat protein concentrate and wheat starch," In *Food Products Formulary*, AVI Publ. Co., Westport, Conn., 2:11–12). This method is advantageous in that gluten vitality is not damaged. Gluten provides the material for forming gas cells in bread-making that provide the bread with texture. Gluten vitality may be lost when gluten is denatured by high temperatures or solubilized by extended exposure to warm water. A good fractionation process should retain gluten vitality.

A method for the fractionation of dough made from white wheat flour was described by Mauritzen and Stewart in 1965 (Mauritzen, C. M., and Stewart, P. R. (1965) "The ultracentrifugation of doughs made from wheat flour" *Austral. J. Biol. Sci.* 18:173–189). In that method, 42 gram portions of a dough were resolved into five to seven layers by ultracentrifugation at 105,000 g for 70 minutes at 30° C. A layer containing 10 to 25% of the total dough had 30 to 60% of the total nitrogen and comprised up to four-fold concentrations of the original dough protein. Complete separation of protein and starch, however, could not be attained. Attempts to reproduce the results of Mauritzen and Stewart (1965) were unsuccessful (Pomeranz, Y. and O. K. Chung (1973–1974) unpublished; and Czuchajowska, Z. and Y. Pomeranz, (1990–1991) unpublished, respectively).

A simple, efficient process by which vital gluten and prime starch can be separated from wheat flour is needed. The process should employ minimal liquid and yield a light waste water load. The resulting protein concentrate should be of high quality and the starch component should have little protein contamination.

BRIEF SUMMARY OF THE INVENTION

The subject invention concerns a novel process for the fractionation of wheat flour into protein concentrate and prime starch components. The claimed process provides a closed system, utilizing minimal water in which high-quality protein concentrates and prime starch can be fractionated rapidly and efficiently from wheat flour.

More specifically, the process comprises forming a dough by mixing flour with a liquid. In a specific embodiment, flour is mixed into a dough with pure water or a dilute solution of sodium chloride. These ingredients are then mixed at about 100 rpm for about 2.5 minutes to form the dough. Additional liquid is then added to the dough to make a final liquid:flour ratio of about 2.0:1. This mixture is then dispersed vigorously by high speed blending for about 3 minutes. Finally, the dispersion is centrifuged to produce distinct layers that can be easily separated and harvested.

As explained more fully herein, the critical aspects of the invention process include:

A) The use of an optimum flour:water ratio in preparation of the dough, followed by;

B) A vigorous break up of the gluten in a blender. Gentle dough treatment in a blender is detrimental to the process in that it allows the continuation of and enhances gluten development which interferes with separation during centrifugation; and C) Allowing enough time during centrifugation at moderate speeds for the gradual layering and separation of the dispersion.

Thus, the subject invention is a surprising, advantageous combination of dough and slurry procedures which is able to rapidly produce a high protein yield while using less water than procedures currently known and used. Furthermore, the procedure is simple and can be used on either a small or large scale. It is also possible to use products generated by the process of the subject invention without drying.

DETAILED DESCRIPTION

The subject invention concerns a unique and advantageous process for obtaining high quality gluten and prime starch from flour. The efficiency of the process is quite surprising because the procedure involves dough-forming steps followed by a dispersion step. The dispersion step results in a dispersion which is also referred to herein as a batter or slurry. Prior to the current invention it was believed by those skilled in the art that a dough step should not be used prior to a dispersion process. Therefore, the subject invention surprisingly utilizes these two procedures in a unique combination which results in the isolation of high quality wheat gluten and prime starch. The process of the subject invention is particularly advantageous because it uses substantially less water and produces a substantially less waste water load than previously known procedures.

A further advantage of the subject invention is that it can be used, producing excellent results, with a variety of different flours as a starting material.

Flours vary in composition and rheological characteristics. Some of these characteristics are presented in Table 1. Hard wheat flours are higher in protein than soft wheat flours; there are no consistent differences in ash or lipid composition. Mixing times, and water absorption values of hard wheat flours are higher than corresponding values for soft wheat flours.

TABLE 1

| Compositional[a] and Physical Characteristics of Flours | | | | Mixogram | |
|---|---|---|---|---|---|
| Flour types | Protein (Nx5.7) (%) | Ash (%) | Free Lipids (%) | Mixing Time (min) | Water Absorption (%) |
| Laboratory milled hard red spring wheat[b] | 14.2 | 0.48 | 0.79 | 4:00 | 68.0 |
| Laboratory milled hard white spring[c] (cv. Klassic) | 11.8 | 0.33 | 0.86 | 6:45 | 65.0 |
| Commercial hard wheat | 12.6 | 0.44 | 1.13 | 3:45 | 68.0 |
| Laboratory milled soft wheat | 9.5 | 0.43 | 1.24 | 1:50 | 58.0 |
| Commercial soft wheat | 8.9 | 0.48 | 1.02 | 3:00 | 57.0 |

[a]Expressed on a 14% moisture basis.
[b]72% extraction
[c]60% extraction

The present invention provides a method for the rapid, efficient fractionation of protein and prime starch components from any one of the wheat flours shown in Table 1 as well as from other wheat flours. The method is applicable to both high-protein hard wheat flours and low-protein soft wheat flours.

In a preferred embodiment of the subject invention, wheat flour is first made into a dough. The dough may be formed of flour and water, or flour and about 0.5% sodium chloride solution. The skilled artisan would appreciate that deviations from these exact ingredients or concentrations could be utilized. For example, other salts can be used and the salt concentration may be up to about 1%.

The dough is formed by mixing the flour and water at about 100 rpm for about 2–5 minutes. Again, deviations from these parameters can be used by those skilled in the art. For example, the mixing may be at 50 to 250 rpm and for a period of time ranging from 1.5 to 20.0 minutes. In one preferred embodiment the dough is allowed to sit or "relax" after mixing. This relaxation period can be from 0 to about 100 minutes, at temperatures not to exceed 50° C.

Next, liquid is added to the dough to achieve a final flour to water ratio of about one part flour to about 2.5 parts of water. This ratio can vary slightly from, for example, 1:1 to 1:4.

The dough and water are then dispersed vigorously by high speed blending for about 3 minutes. The exact length of time can vary as would be appreciated by those skilled in the art. The vigorous dispersion breaks up the gluten and prevents continued gluten development that interferes with the subsequent separation.

The resulting dispersion is then centrifuged for separation into its component parts. The centrifugation is performed at moderate speeds and for a sufficient length of time to allow gradual layering. The speed may be, for example, 2,500 rpm (1,500 g) and the time period can be about 15 minutes. The speed may vary from about 750 to about 3,000 g. The time may vary from about 10 to 30 minutes. Typically, up to six distinct gradient layers are produced. These layers may be separated and harvested for use in various products. The bottom-most layer in the centrifuge tube is pure starch and comprises approximately one-third of the sample volume. A thin layer atop the prime starch layer comprises insoluble fiber. A well-defined protein-rich gluten layer is next and accounts for approximately one-eighth of the dry weight of the sample. Layered atop the protein-rich layer is a layer of starch tailings. The water soluble components appear next in an aqueous layer comprising approximately one-third of the volume of the sample. Layered atop the water solubles is a second protein-rich gluten layer which is less in volume and dry weight than the more dense protein layer below.

Thus, one or two-protein-rich layers are formed in the claimed method: a minor one at the top of the centrifuge tube (first gluten layer) and a major one between the tailings starch and insoluble fiber (second gluten layer). As expected, high-protein hard wheat flours produce larger gluten-rich layers than the low-protein soft wheat flours.

The yield of protein from the second gluten-rich layer is higher than from the first gluten layer. Yields, however, must be evaluated in the context of the protein content of each layer, total protein recovery, the presence of one vs. two layers and the ease of separation of the layers. While the main objective is to obtain a gluten concentrate with a high protein content, a low protein content in the prime starch layer is of equal significance, especially as starch is the main flour component.

The claimed method provides prime starch fractions with protein concentrations that range from about 0.6 to about 0.7%. These percentages are not consistently affected by flour source. The prime starch fraction comprises mostly A starch, large granules. The mean protein in the tailings starch fraction is higher in doughs from soft wheat flours than from hard wheat flours, a reflection of the better separation obtained using higher protein flours. The tailing starch layer comprises mostly B starch, small granules. Water solubles are a consistent, rich source of protein.

As would be appreciated by a person skilled in the art in possession of the current disclosure, the amount of water present in the resulting fractions should be considered in choosing a fractionation process. Water must be evaporated from these fractions to produce dry storable products, if such products are desired. Of particular significance is the amount of water in the water-soluble fraction that must be removed to make a storable product.

In the preferred embodiment, the two main fractions, prime starch and gluten, contain on the average 40 and 65%, respectively, water. The insoluble fiber fraction is relatively dry. The tailings fraction binds a large amount of water. While the water soluble fraction contains as much as 97% water, its dry matter content is higher than that in the water soluble fractions from high water load fractionation techniques.

The resulting components from the claimed fractionation process can be used in the production of various products. Some of the fractions can be used without drying. The protein-rich gluten layers can be used as part of a system for the production of baked goods that require high gluten levels such as hearth-baked bread, specialty breads, and high-fiber breads, or may be used for low-protein flour enrichment. Unique adhesive and film forming characteristics of hydrated gluten and thermosetting properties make gluten available for use as ground meat extenders, additives to turkey roll or sausages and non-food applications including emulsifiers for pharmaceutical pastes, sausage casings, paper coating, and yarn sizing. Prime starch can be used in the production of baked products that require low protein levels such as cookies, cakes, and confectioneries, or can be used as a thickener in foods or as an all purpose absorbent. Water solubles can be used as animal feed, for microbiological processing, pharmaceuticals, and for general industrial utilization.

The use of the fractionation products in a combined plant could substantially reduce the plant's energy cost. The claimed process retains the functional properties of the gluten proteins. These properties can be further enhanced by interaction-incorporation of additives (i.e. emulsifiers).

Additionally, the claimed process can be used for fractionation on a large and small scale and could assist the gluten industry at large which uses a plethora of fractionation techniques to screen flours for the production of gluten or protein concentrates. The claimed process can serve as a tool to evaluate the suitability of a flour for industrial separation into gluten and prime starch.

Following are examples which illustrate procedures, including the best mode, for practicing the invention. These examples should not be construed as limiting.

Example 1: Fractionation of Four Types of Wheat Flour

Four flours were tested using the process of the subject invention; two were milled from hard wheats and two from soft wheats; flours were milled commercially or experimentally on a Bühler laboratory mill. Two batches of both soft and hard wheat, commercially milled flours (from the same mill, similar grist, and approximately same milling extraction) were obtained. The total protein content of the two hard wheat and of the two soft wheat flours were the same within experimental error.

The flours were fractionated by the following procedure: 200 grams of flour (moisture free basis) were mixed in a National Mfg. Co., (Lincoln, Nebr.) mixer at 65% absorption (hard wheat flour) or 55% absorption (soft wheat flours) at 110 rpm for 2.5 minutes with water. The resulting dough was kept at 15° C. for 40 minutes in 200 ml water. The combined dough and water solution was transferred to a blender with enough liquid to make the total (including that used in dough mixing and soaking) 500 ml. The total weight was 700 grams (200 grams flour and 500 ml liquid). The dough was dispersed by vigorous (high speed) blending (Osterizer, J. Oster Mfg. Corp., Milwaukee, Wis.) for 3 minutes and centrifuged for 15 minutes at 2,500 rpm (1,500 g). The following six layers were separated manually from the centrifuge tube:

(a) a bottom layer, containing pure starch which was well separated from
(b) a layer of insoluble fiber, the thickness of which depended on the flour type (hard or soft) and extraction rate,
(c) a well developed and easy to peel major protein-rich, (second) layer,
(d) tailings starch, which could be washed out from the top of the protein layer (c) by a water or dilute NaCl stream,
(e) the water solubles, and
(f) a minor, top protein-rich (first) layer.

Proteins in fractions (c) and (f) were the gluten type as determined by solubility and electrophoretic studies.

Fractions (b)–(f) were frozen and freeze dried; fraction (a) was air dried on trays at room, temperature (about 21° C). Fractions (a), (b), and (d) were ground once and fractions (c) and (f) twice on a grinder (Udy Corp., Ft. Collins, Colo.) to pass a sieve with 0.25 mm round openings. Fraction (e) was hand ground in a mortar.

Yields and protein (moisture-free basis) of fractions separated from the four flours are given in Table 2. Protein concentrations in the prime starch fractions ranged from about 0.6 to 0.7% and were not consistently affected by flour source. Protein ranged from 2.2 to 5.1% (mean 3.5%) in the insoluble fiber fraction and from 6.9 to 13.7% (mean 9.9%) in the tailings starch fraction. The mean protein in the tailings starch fraction was higher in doughs from soft wheat flours (12.7%) than from hard wheat flours (7.2%), a reflection of the better separation obtained with higher protein flours. The water solubles were a consistent and rich source of protein (range: 17.5% to 21.3, mean 19.6% on a dry matter basis).

The highest protein concentrations were recorded in the first gluten layer; the protein concentration in this layer ranged from 54.6 to 61.3% (mean 58.4). Mean protein was higher in the first gluten layer of high-protein flours (61.3%) than of low protein flours (55.5%). The second gluten layer ranged in protein content from 47.4% to 57.8%; mean 52.5%.

gation speed to 2000 g did not improve yields or quality of the fractions.

TABLE 3

Recovery of Protein (% of total protein in Flour) in Gluten-Rich Fractions

| Description of Flour | Gluten Layer | | Combined |
|---|---|---|---|
| | First | Second | |
| Hard Wheat, Laboratory | 26.7 | 63.4 | 90.1 |
| Hard Wheat, Commercial | 13.1 | 75.5 | 88.6 |
| Soft Wheat, Laboratory | 9.8 | 73.1 | 82.9 |
| Soft Wheat, Commercial | 16.6 | 66.7 | 83.3 |

Example 2: Fractionation Processes of Wheat Flour

The following experiments were conducted to assess the effect of reducing the processing time and reducing the amount of water used on the claimed process. In one series of experiments (conducted on two commercially milled flours from hard and soft wheats) the 40 minutes relaxation time was omitted. In the other series, conducted on three flours, relaxation was omitted and the flour to liquid ratio was reduced from 1:2.5 to 1:2.0. The flours in this series were one laboratory milled hard wheat and the two commercially milled wheats (hard and soft).

TABLE 2

Yield and Protein of Fractions Obtained from Wheat Flour

| Fractions | Laboratory Milled Hard Wheat Flour | | Commercially Blended Hard Wheat Flour | | Laboratory Milled Soft Wheat Flour | | Commercially Blended Soft Wheat Flour | |
|---|---|---|---|---|---|---|---|---|
| | Yield (%) | Protein (%) | Yield (%) | Protein (%) | Yield (%) | Protein (%) | Yield (%) | Protein (%) |
| (f) Gluten-first layer | 7.1 | 61.3 | 3.1 | 61.2 | 3.2 | 56.4 | 1.8 | 54.6 |
| (e) Water solubles | 3.6 | 21.1 | 4.3 | 17.5 | 3.6 | 21.3 | 3.7 | 18.3 |
| (d) Tailings starch | 5.0 | 7.5 | 6.2 | 6.9 | 3.5 | 11.6 | 3.0 | 13.7 |
| (c) Gluten-second layer | 21.8 | 47.4 | 21.7 | 50.5 | 13.6 | 52.9 | 12.8 | 57.8 |
| (b) Insoluble fiber | 1.6 | 2.2 | 2.9 | 2.6 | 2.7 | 5.1 | 3.6 | 4.1 |
| (a) Prime starch | 60.9 | 0.7 | 61.8 | 0.6 | 73.4 | 0.6 | 75.1 | 0.7 |

As stated above, the yields of layers and distribution of protein in those layers should be evaluated from the standpoint of protein recovered in the gluten layers as a percentage of the total protein in the flour. The results are summarized in Table 3. Total flour protein recoveries were higher in fractionations of high-protein hard wheat flours (mean 89.4%) than of low-protein soft wheat flours (83.1%). The difference reflects, in part at least, differences in water soluble proteins among the flours. Increasing the dough mixing time to 10 minutes, the dough dispersion time to 5 minutes, or the centrifu- A comparison of the yield and protein content of the fractions of wheat flours obtained with and without relaxation is shown in Table 4. Under both conditions, most of the protein was recovered in two layers. Elimination of relaxation significantly increased the yield of the first layer, at the expense of the second layer. Yield of prime starch was unaffected. Dough relaxation did not affect the general fractionation patterns, total protein recovery, or protein contents of the starch fraction. Eliminating relaxation, however, lowered the protein content in the second protein layer.

TABLE 4

Effect of Eliminating Relaxation on Yield of Fractions from Commercial Wheat flours and Their Protein Contents

| Fraction | Hard Wheat | | | | Soft Wheat | | | |
|---|---|---|---|---|---|---|---|---|
| | Yield (%) | | Protein (%) | | Yield (%) | | Protein (%) | |
| | relaxed | not relaxed | relaxed | not relaxed | relaxed | not relaxed | relaxed | not relaxed |
| Gluten first layer | 2.5 | 5.9 | 58.6 | 60.4 | 2.2 | 4.5 | 54.8 | 57.1 |
| Gluten second layer | 22.0 | 19.6 | 52.2 | 46.9 | 15.4 | 14.6 | 55.4 | 50.1 |
| Prime | 63.0 | 60.9 | 0.8 | 0.7 | 70.0 | 68.3 | 0.7 | 0.7 |

TABLE 4-continued

Effect of Eliminating Relaxation on Yield of Fractions from Commercial Wheat flours and Their Protein Contents

| | Hard Wheat | | | | Soft Wheat | | | |
|---|---|---|---|---|---|---|---|---|
| | Yield (%) | | Protein (%) | | Yield (%) | | Protein (%) | |
| Fraction | relaxed | not relaxed | relaxed | not relaxed | relaxed | not relaxed | relaxed | not relaxed |
| Starch | | | | | | | | |

Neither relaxation nor reduction of total water impaired the layering and ease of separation of the layers.

TABLE 5

Effect of Eliminating Relaxation and Reducing Water to Flour Ratio on Yields of Fractions and Their Protein Contents

| | Commercial Flour | | | | Laboratory Milled Flour | |
|---|---|---|---|---|---|---|
| | Hard | | Soft | | HWS[a] | |
| Fraction | Yield (%) | Protein (%) | Yield (%) | Protein (%) | Yield (%) | Protein (%) |
| Gluten first layer | 1.9 | 67.0 | 1.8 | 66.9 | 1.1 | 66.2 |
| Gluten second layer | 24.2 | 48.1 | 15.6 | 52.5 | 19.7 | 57.7 |
| Prime Starch | 60.0 | 0.8 | 71.7 | 0.7 | 71.8 | 0.6 |

[a]Hard white spring wheat (cv. Klassic), 60% extraction

The reduction of the ratio of flour to water from 1:2.5 to 1:2.0 significantly lowered (by 30 to 38%) the volume of the water soluble fraction, yet did not affect the other fractions. Reduction of the volume of the water soluble fraction is of particular interest because of the high amount of energy required to remove water from this layer.

The net result of the experimental changes were to reduce the amount of water in the water soluble fraction and shorten the processing time from about 1 hour to about 30 minutes. Total protein recoveries in the protein-rich layers for all flours ranged from 81.6% to 90.8%, an excellent result for such a short and simple procedure.

In another set of experiments, commercial hard wheat flour was fractioned by the short method (i.e. not relaxed, flour to water ratio 1:2.0). Upon harvest, the second gluten layer had a protein content of 48.1% on a dry matter basis. A single wash of the combined wet gluten layers (250 g) in 200 ml of water for 2 minutes increased the protein content to 65.7%. A second wash increased the protein content to 76.2%. The above values were based on a conversion factor of $N \times 5.70$. Corresponding values using the industry standard factor of $N \times 6.25$ are 52.7%, 72.0% and 83.6%, respectively.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A process for fractionating wheat flour into components including a protein concentrate, prime starch, and water solubles, wherein said process consists essentially of the following steps:

A) forming a gluten-containing dough comprising liquid and flour wherein said dough is formed by mixing said flour and said liquid;
   B) adding additional liquid to the gluten-containing dough produced in step A to achieve a total liquid to flour ratio about 2 to 1 to about 2.5 to 1;
   C) dispersing the composition produced in step B by high speed blending; and
   D) centrifuging the composition produced in step C in order to obtain distinct layers of protein concentrate, prime starch and water solubles, wherein said dough is not heated to temperatures exceeding 50° C.

2. The process, according to claim 1, wherein said liquid is a dilute sodium chloride solution in water.

3. The process, according to claim 2, wherein said dilute solution comprises less than about one percent sodium chloride in water.

4. The process, according to claim 1, further comprising the step of allowing said dough to relax after it is formed and before liquid is added.

5. The process, according to claim 1, wherein said dough is allowed to relax for approximately 40 minutes at about 15 degrees Centigrade.

6. The process, according to claim 1, wherein said liquid and flour are present in a ratio of about 1:1 or there is more flour than liquid.

* * * * *